Apr. 17, 1923.

J. L. DONAT

RESILIENT WHEEL

Filed Dec. 26, 1919

1,452,294

Inventor;
Joseph L. Donat
By Jones Hain & Hinkle
Attys.

Patented Apr. 17, 1923.

1,452,294

UNITED STATES PATENT OFFICE.

JOSEPH L. DONAT, OF CHICAGO, ILLINOIS.

RESILIENT WHEEL.

Application filed December 26, 1919. Serial No. 347,260.

*To all whom it may concern:*

Be it known that I, JOSEPH L. DONAT, a citizen of the United States, residing at Chicago, in the county of Cook and State of Illinois, have invented certain new and useful Improvements in Resilient Wheels, of which the following is a specification.

The invention relates to improvements in resilient tire wheels.

One of the objects of the invention is to provide a pneumatic puncture-proof tire.

Another object is to provide a tire that may be secured to a standard rim.

Another object is to provide a composite floating rim, between the cushion tire and the casing containing the pneumatic inner tube.

Another object is to provide a pneumatic tire overlaid by a cushion tire, with an intermediate two-part rim, said parts separated circumferentially from each other to leave air spaces therebetween, so that injurious heat cannot be transmitted from the cushion tire to the pneumatic tire.

Another object is to provide a new and peculiar form of tire casing.

Other, further and more specific objects of my invention will become readily apparent to persons skilled in the art from a consideration of the following description when taken in conjunction with the drawings, wherein:—

In both views the same reference characters are employed to indicate similar parts.

Figure 1:
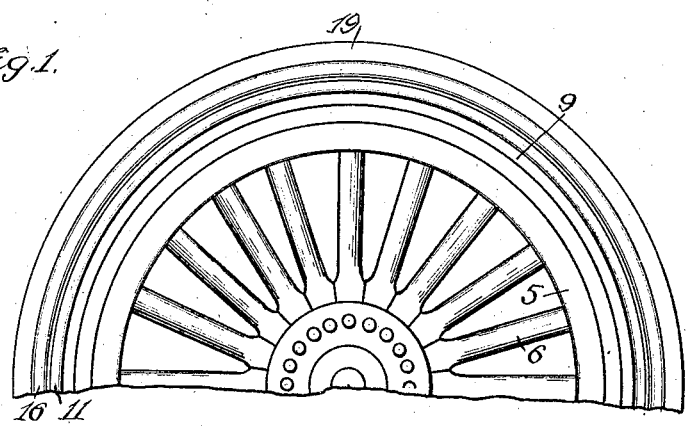
Fig. 1 is a side elevation of one-half of a wheel, provided with my improved structure.
Figure 2:
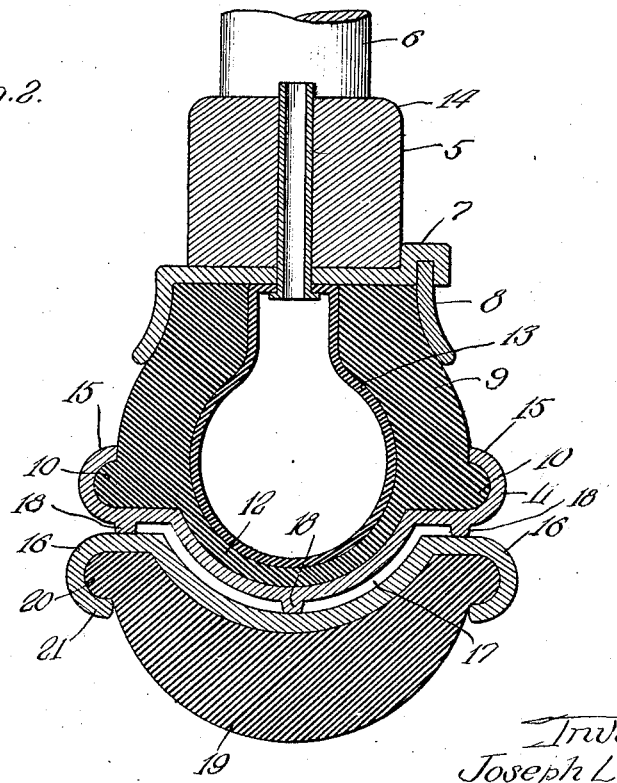
Fig. 2 is a cross section through the circumferential parts to the wheel.

The wooden rim or felly 5 of the wheel to which the spokes 6 are attached, is of the usual form. A standard rim 7, having a removable ring 8 is attached to the rim 5 of the wheel as in the ordinary straight sided tire casing.

In the particular embodiment, the casing 9 is U-shaped in cross section, having an outstanding bead 10 on each side thereof, of clincher form for the rim part 11. The casing 9 is thinner at its periphery, as at 12, where it is re-inforced by the rim 11. An inner tube 13 provided with a valve tube 14, which passes thru the wooden felly or rim 5, is located within the casing 9. The rings 11 have inturned terminal edges 15 to encompass the bead 10, thereby to hold the tire casing and the rim together. Another rim portion 16, somewhat larger in diameter than the rim 11, surrounds the latter and is spaced apart therefrom as at 17, being riveted or spotwelded to lugs 18 provided on the rim 11. A cushion tire 19 overlies the rim 16 and is provided with laterally extending beads 20 to be received in the circumferentially extending curved portions provided by the outwardly turned edges 21 of the rim 16.

The circumferentially extending opening 17, between the tire rims 11 and 16, provides an air space, for the circulation of air, so that the heat imparted to the rim 16, by the tire cushion 19, is not transmitted to the rim 11 and from thence to the interior inner tube 13.

The inner rim 11 may be severed to provide an open ring and sprung into place inside of the rim 16. Suitable spacers between the rims keep them apart to provide the intermediate air space and the rims may be welded or riveted together at these points.

Having described my invention, what I claim is new and desire to secure by Letters Patent is:—

A device of the character described comprising an annular casing substantially U-shape in cross section having relatively thick side walls joined by a relatively thin transversely curved peripheral wall of uniform thickness and extending radially beyond the abrupt terminal edges of the side walls, said side walls providing abrupt shoulders at their junctions with the peripheral wall; integral annular beads extending laterally from the lower edges of the side walls, and a rim having parts underlying the shoulders provided by the juncture of the side walls with the peripheral wall and inwardly curved edges overlying said beads and an intermediate curved peripheral portion in intimate contact with the intermediate peripheral wall.

In testimony whereof I hereunto subscribe my name.

JOSEPH L. DONAT.